UNITED STATES PATENT OFFICE 2,602,796

1-CARBAMYL-4-THIAZOLYL PIPERAZINES

Hugh Wendell Stewart, Plainfield, N. J., assignor to American Cyanamid Company, New York, N. Y., a corporation of Maine No Drawing. Application November 24, 1950, Serial No. 197,504

6 Claims. (Cl. 260—268)

The present invention relates to thiazolyl piperazines, particularly to 1-(2-thiazolyl) piperazines having a

group in the 4-position. More specifically, the invention relates to compounds capable of representation by the generic formula:

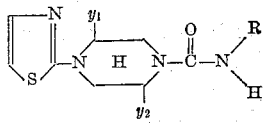

wherein $y_1$ and $y_2$ may be hydrogen or methyl, and R may be an alkyl radical of 1–6 carbon atoms, cyclohexyl, phenyl, naphthyl, radical or an alkyl-, alkoxy-, or halogen-substituted phenyl radical. The invention also contemplates both the method of preparation and the products per se.

The compounds of the present invention being 1,4-substituted piperazines, the latter ring is shown as saturated. However, in addition to the 1,4-substituents, the carbon atoms of the ring may also be substituted. As shown in the generic formula above, $y_1$ and $y_2$ may be either hydrogen or methyl. The invention, therefore, contemplates 1,4-disubstituted, mono- and dimethyl piperazines.

The compounds of the present invention, therefore, may be classified as carbamyl piperazines. In general, they comprise white crystalline materials. The compounds are, in general, only slightly soluble in water, ordinary ether and petroleum ether, but readily soluble in the ordinary alkanols. Compounds of the present invention in general have anticonvulsant properties. They exhibit distinct possibilities as pharmacologically-active compounds for this purpose.

Preparation of typical compounds of the present invention is more fully shown in conjunction with the following example which is given as illustrative and not by way of limitation. All parts are by weight unless otherwise noted.

EXAMPLE 1

*1-(2-thiazolyl)-4-(n-hexylcarbamyl)piperazine*

A solution of 19 parts of n-hexyl isocyanate in 70 parts of dry diethyl ether is slowly added with cooling, over a period of about 15 minutes, to a solution of 25 parts of 1-(2-thiazolyl) piperazine in 140 parts of dry ether. The white precipitate, which separates from the reaction mixture, is isolated by filtration and crystallized from naphtha. When pure, it melts at 124–125° C.

By using the above procedure, but substituting therein an equivalent amount of an isocyanate listed in column 1 of the following table for the n-hexyl isocyanate there is obtained the corresponding piperazine derivative listed opposite thereto in column 2 of the table. Melting points of the latter compounds are given in column 3 of the table.

TABLE I

| Isocyanate | Compound | Melting Point °C. |
|---|---|---|
| cyclohexyl | 1-(2-thiazolyl)-4-cyclohexylcarbamylpiperazine. | 145–146 |
| phenyl | 1-(2-thiazolyl)-4-phenylcarbamylpiperazine. | 159–160 |
| o-chlorophenyl | 1-(2-thiazolyl-4-(o-chlorophenylcarbamyl) piperazine. | 117.5–118.5 |
| m-chlorophenyl | 1-(2-thiazolyl)-4-(m-chlorophenylcarbamyl) piperazine. | 146–147 |
| p-bromophenyl | 1-(2-thiazolyl)-4-(p-bromophenylcarbamyl) piperazine. | 172.5–173.5 |
| p-phenetyl | 1-(2-thiazolyl)-4-(p-phenetylcarbamyl) piperazine. | 188–190 |
| p-tolyl | 1-(2-thiazolyl)-4-(p-tolylcarbamyl) piperazine. | 177–178.5 |
| alpha-naphthyl | 1-(2-thiazolyl)-4-(alphanapthylcarbamyl) piperazine. | 204–205 |
| beta-naphthyl | 1-(2-thiazolyl)-4-(betanaphthylcarbamyl) piperazine. | 186–187 |

In the foregoing example, all of the products were prepared by a reaction which can be generally represented in the following way:

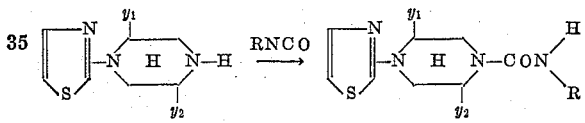

While this reaction is of general utility, certain precautions must be noted with regard to its use.

In most instances this general reaction is exothermic. However, the exothermic character of the reaction may be controlled readily by cooling the reaction mixture, by regulating the rate of mixing of the two reactants, and by using a solvent and/or diluent for the reaction. Though no solvent need be used for the reaction, we prefer to use a solvent for several reasons. A solvent, acting also as a diluent, makes the exothermic character of the reaction more easily controllable. The proper choice of a solvent is also advantageous in keeping the reactants dissolved while allowing the product to crystallize freely in a relatively pure state as the reaction proceeds.

Though a wide variety of materials such as petroleum ether, naphtha, benzene, toluene, chlorobenzene, dioxane, chloroform, pyridine, and the like, may be used as solvents for the above general reaction, a dialkyl ether, such as diethyl ether, dibutyl ether and the like is preferable. These ether solvents are particularly effective in dissolving both of the reactants and yet allowing the product of the reaction to crystallize freely as it is formed.

In general, the temperature at which this general reaction may be carried out is not critical. If necessary it may be carried out between 0° C. and the boiling point of the solvent. However, for practical reasons the temperature range of about 0° to 35° C. is to be preferred.

Isolation of the product from the reaction mixture is readily accomplished. Since the product crystallizes in a relatively pure form directly from the reaction mixture, it may be isolated simply by filtration. If it is desirable to have the product in a state of higher purity than it is after isolation, the product may be recrystalized from a suitable solvent, such as naphtha, or a mixed solvent, such as alcohol-ether.

In addition to the above general type reaction in which a 1-heterocyclic piperazine is treated with an organic isocyanate to give the desired compounds of this invention, 4-carbamyl-1-(2-thiazolyl) piperazines, there are several other general methods by which these compounds may be prepared. Three of these general methods are sketched as follows (wherein X represents halogen):

(1)
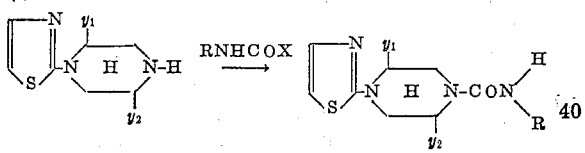

(2)
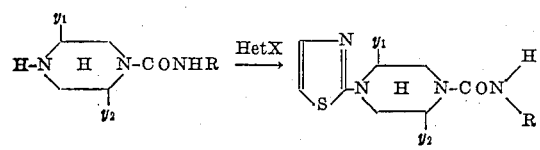

(3)
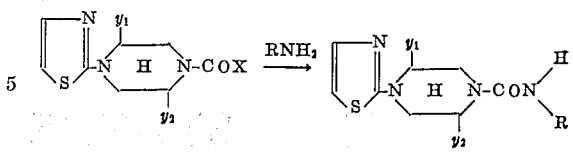

Though, in the preparation of specific compounds, one of these methods may be preferable, in general the starting materials for these methods are less readily available than the materials for the previously described method. It is primarily because of this that the previously described method is to be preferred.

I claim:

1. A 1-(2-thiazolyl) piperazine of the formula

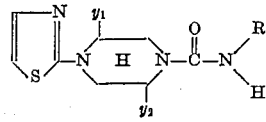

wherein $y_1$ and $y_2$ are selected from the group consisting of hydrogen and methyl, R is selected from the group consisting of the alkyl radicals of 1–6 carbon atoms, the cyclohexyl, phenyl and naphthyl radicals and the alkyl-, alkoxy-, and halogen-substituted phenyl radical.

2. 1-(2-thiazolyl) - 4 - phenylcarbamylpiperazine.

3. 1-(2-thiazolyl)-4-(o - chlorophenylcarbamyl)piperazine.

4. 1-(2-thiazolyl)-4-(p - bromophenylcarbamyl)piperazine.

5. 1 - (2 - thiazolyl)-4-cyclohexylcarbamylpiperazine.

6. 1-(2-thiazolyl)-4-(n - hexylcarbamyl)piperazine.

HUGH WENDELL STEWART.

REFERENCES CITED

The following references are of record in the file of this patent:

UNITED STATES PATENTS

| Number | Name | Date |
|---|---|---|
| 2,519,715 | Stewart | Aug. 22, 1950 |